(12) United States Patent
Hermansson et al.

(10) Patent No.: US 8,438,837 B2
(45) Date of Patent: May 14, 2013

(54) CONTROL OF AN EXHAUST GAS AFTERTREATMENT DEVICE IN A HYBRID VEHICLE

(75) Inventors: Jonas Hermansson, Lindome (SE); Anders Holger Johnsson, Göteborg (SE); Niklas Vollmer, Åsa (SE)

(73) Assignee: Volvo Car Corporation, Goeteborg (SE)

( * ) Notice: Subject to any disclaimer, the term of this patent is extended or adjusted under 35 U.S.C. 154(b) by 1116 days.

(21) Appl. No.: 12/140,731

(22) Filed: Jun. 17, 2008

(65) Prior Publication Data
US 2009/0025371 A1   Jan. 29, 2009

(30) Foreign Application Priority Data
Jun. 19, 2007   (EP) .................................. 07110523

(51) Int. Cl.
*F01N 3/00*   (2006.01)
(52) U.S. Cl.
USPC .................... 60/286; 60/274; 60/284; 60/303
(58) Field of Classification Search .................... 60/274, 60/283, 284, 285, 286, 303; 180/65.1, 65.21, 180/65.28, 309
See application file for complete search history.

(56) References Cited

U.S. PATENT DOCUMENTS

| | | | |
|---|---|---|---|
| 6,161,377 A | 12/2000 | Boegner | |
| 6,318,077 B1 | 11/2001 | Claypole | |
| 6,389,807 B1 * | 5/2002 | Suzuki et al. | 60/285 |
| 6,581,373 B2 * | 6/2003 | Suzuki et al. | 60/285 |
| 6,742,327 B2 * | 6/2004 | Inoue et al. | 60/285 |
| 6,785,603 B2 * | 8/2004 | Inoue | 701/112 |
| 6,901,749 B2 | 6/2005 | Hashimoto | |
| 7,055,312 B2 * | 6/2006 | Osawa et al. | 60/285 |
| 7,080,507 B2 * | 7/2006 | Katogi et al. | 60/289 |
| 7,418,957 B2 * | 9/2008 | Abe | 123/697 |
| 2004/0194452 A1 | 10/2004 | Inoue | |

FOREIGN PATENT DOCUMENTS

| | | | | |
|---|---|---|---|---|
| EP | 0 935 056 A2 | 1/1999 | | |
| EP | 1 174 612 A1 | 7/2001 | | |
| JP | 2003-232217 | * | 8/2003 | 60/286 |

* cited by examiner

*Primary Examiner* — Binh Q Tran
(74) *Attorney, Agent, or Firm* — Brooks Kushman P.C.

(57) ABSTRACT

The present invention involves a method for maintaining temperature in an exhaust gas treatment device for an internal combustion engine in a hybrid vehicle. The engine has a crankshaft and at least one cylinder. The hybrid vehicle has a fuel storage device and a fuel supply device. An exhaust gas treatment device is located downstream of the cylinder. The method comprises, in an engine off mode, pumping air to the exhaust gas aftertreatment device controlling the fuel supply device so that fuel is allowed to the exhaust gas aftertreatment device. Air flow to the exhaust gas aftertreatment device can be controlled by a throttle in an inlet duct to the engine and/or the fuel supply device to control the combustion and air-fuel ratio in the exhaust gas treatment device.

25 Claims, 11 Drawing Sheets

CONTROL OF AN EXHAUST GAS AFTERTREATMENT DEVICE IN A HYBRID VEHICLE

TECHNICAL FIELD

The present invention relates to a hybrid vehicle, a hybrid vehicle propulsion system, and a method for an exhaust gas aftertreatment device for an internal combustion engine in a hybrid vehicle further having an additional power source. The internal combustion engine has a crankshaft and at least one cylinder, the hybrid vehicle further comprising fuel storage device and fuel supply device, the exhaust gas treatment device located downstream of the cylinder.

BACKGROUND

The drivetrain of a hybrid vehicle includes two combined power sources for the propulsion of the vehicle. Usually an internal combustion engine is combined with an additional power source connected to or including an energy storage unit which can be charged by the internal combustion engine, and, in many solutions, also by recovering the braking energy of the vehicle.

In so called hybrid electric vehicles, the additional power source is typically an electric motor connected to an energy storage unit including rechargeable electric accumulators for energy storage. In alternative hybrids, the additional power source could include, instead of electric components, a variable displacement pump communicating with a hydraulic accumulator for energy storage, essentially in the form of a pressure tank. There are also hybrid concepts in which the additional power source includes a flywheel which stored energy and is connected to a hydrostatic transmission. In further hybrid ideas, the additional power source includes an air engine connected to an air tank for energy storage. The additional power source can also be a human, such as in the case with a moped.

The drivetrain of a hybrid vehicle can be provided as a parallel hybrid arrangement, in which the engine and the additional power source (e.g. electric motor) are both connected to a mechanical transmission for delivering torque to the wheels. Where the additional power source is an electric motor, this is often provided as a combined generator and motor. Differing from parallel hybrid arrangements, in a series hybrid arrangement there is no power path from the engine to the wheels. The main task of the engine is to provide power to the additional power source and/or the energy storage unit connected thereto. Combined hybrids have features from both parallel and series hybrid arrangements, in that they have power split devices allowing the power path from the engine to be mechanically directed to the wheels, or to be directed to the additional power source or the energy storage unit connected thereto.

The operation of most hybrid vehicles with internal combustion engines usually includes a number of different modes for the power distribution in the drivetrain. For example, the vehicle can be run in a cruise mode, in which the power from the engine is split into a path to the wheels and a path to the energy storage unit, e.g. to batteries via a generator. As another example, the vehicle can be run in an energy storage unit charge mode, (for a hybrid electric vehicle usually referred to as a battery charge mode), during engine idling, in which the energy storage unit is charged by the engine, e.g. via a generator. In parallel or combined hybrid arrangements, there could also be a power boost mode in which power is provided to the wheels from both the engine and the power source.

In addition, the operation of most hybrid vehicles with internal combustion engines usually includes engine off modes, in which the internal combustion is shut down. Such modes can include a mode in which propulsion is provided only by the additional power source. An example of such a mode is a so called electric vehicle mode in a combined or parallel hybrid electric vehicle. For the vehicle to run in an engine off mode, necessary accessories are powered by the additional power source.

Usually, one or more exhaust gas aftertreatment devices, known as catalytic converters, are provided in the exhaust system of the engine. Catalytic converters convert regulated gases, such as hydrocarbons (HC), carbon monoxide (CO) and nitrogen oxides (NOx), into substances such as carbon dioxide (CO2), nitrogen (N2) and water (H2O). A catalytic converter can not fully exhibit its converting effects when its temperature is lower than its activation temperature. A problem with hybrid vehicles is that during engine off modes, the catalyst converter temperature can fall below the activation temperature, in which case HC and NOx emission are not efficiently processed in the exhaust gas aftertreatment devices when the internal combustion engine is started again.

For vehicles in general, many catalyst heating strategies have been suggested. U.S. Pat. No. 6,161,377 and U.S. Pat. No. 6,901,749 are concerned with rapidly heating the catalytic converter during cold starts. EP0935056A2 describes shutting off ignition in one or more cylinders when cranking during engine start, to heat the cold catalyst. EP1174612A1 describes, in a diesel engine application for regeneration of a particulate filter or a NOx-trap, injecting fuel into the cylinders during an engine braking situation. However, none of these references describe hybrid vehicles.

US2004/0194452A1 discloses a hybrid vehicle where fuel supply is carried out during an initial period of cranking for resuming the operation of the internal combustion engine. U.S. Pat. No. 6,318,077B1 describes a special heater for a catalyst for rapid heating of the catalyst at a cold start. However, none of these references describe maintaining catalyst temperature during an engine off mode.

SUMMARY OF THE INVENTION

The problems described above are overcome by providing air and fuel to the exhaust gas aftertreatment device while the engine is not operating which leads to oxidation of the fuel in the exhaust gas aftertreatment device to maintain the temperature within its activation range. The air can be provided by rotating the engine by the additional power source and control of the air quantity can be accomplished by a throttle valve in an inlet duct of the engine. Alternatively, the air is provided into the exhaust system directly. Fuel is supplied by the fuel injectors, either located in the port or in the cylinder. In a gasoline engine with spark plugs, combustion in the cylinder is avoided by preventing the spark plugs from firing. In a diesel engine, combustion in the cylinder is avoided by injecting fuel into the cylinder late in the expansion stroke such that the fuel does not compression ignite. Alternatively, fuel can be supplied directly into the exhaust system.

In yet another alternative, fuel is supplied from the canister aboard the vehicle which traps fuel vapors during refueling and from fuel tank vapor generation due to changes in temperature. A purge gas valve is opened to allow air to remove the trapped vapors and induct them through the engine and into the exhaust system.

The fuel and air supplied to the exhaust gas aftertreatment device is controlled to provide a desired air-fuel ratio, which is greater than 1.0, preferably between 1.25 and 2.0.

Further, the fuel and air supplies are controlled so that the maximum temperature in the exhaust gas aftertreatment device occurs in a desired location along the length of the exhaust gas aftertreatment device. The desired location is downstream of a front edge, as much as 50% of the distance into the exhaust gas aftertreatment device.

It should be noted that the air flow can be controlled any suitable device, such as a throttle valve, and/or control of inlet valves and/or the exhaust valves in the cylinders, e.g. in the form of a variable valve timing (VVT) system and/or a cam profile shifting (CPS) system.

It is an advantage of the present invention that the hybrid vehicle emission are reduced by maintaining an activation temperature in the exhaust gas aftertreatment device even when the engine is not operating. By doing so, high emissions upon engine restart are avoided.

DESCRIPTION OF THE FIGURES

Below, the invention will be described in detail with reference to the drawings, in which.

DETAILED DESCRIPTION

Figure 1:
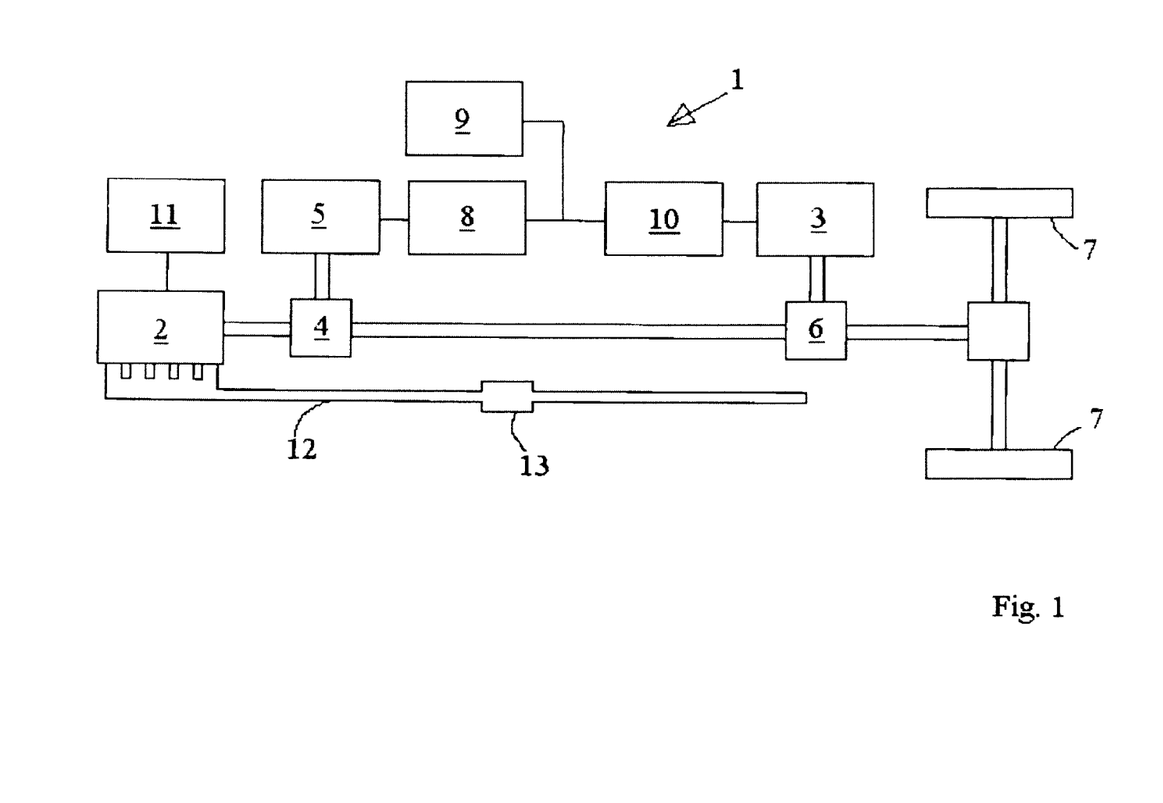
FIG. 1 shows a schematic view of a hybrid vehicle propulsion system with a combined hybrid structure.

FIG. 1 shows parts of a hybrid vehicle propulsion system 1 with a combined hybrid structure, the propulsion system 1 having an internal combustion engine 2 and an additional power source 3 in the form of an electric motor 3. A first transmission 4 provides in a manner known in the art a mechanical connection between the engine 2, a generator 5 and a second transmission 6, which in turn provides a mechanical connection between the engine 2 via the first transmission 4, the motor 3 and two wheels 7 of the vehicle. The generator 5 is electrically connected to a charger 8, which in turn is connected to an energy storage unit 9 comprising a plurality of batteries, and to a converter 10, the latter being connected to the motor 3. Fuel storage tank 11 comprising a fuel tank 11, and an exhaust system 12 with an exhaust treatment device 13 in the form of a catalytic converter 13 are provided for the engine 2.

Transmissions 4, 6 are controllable as described below and work as power split devices to allow the power path from engine 2 to be mechanically directed to wheels 7, or to be directed via generator 5 and charger 8 to motor 3 or to batteries 9. Transmissions 4, 6 also allow mechanical power from motor 3 to be directed to engine 2, as discussed closer below.

Figure 2:
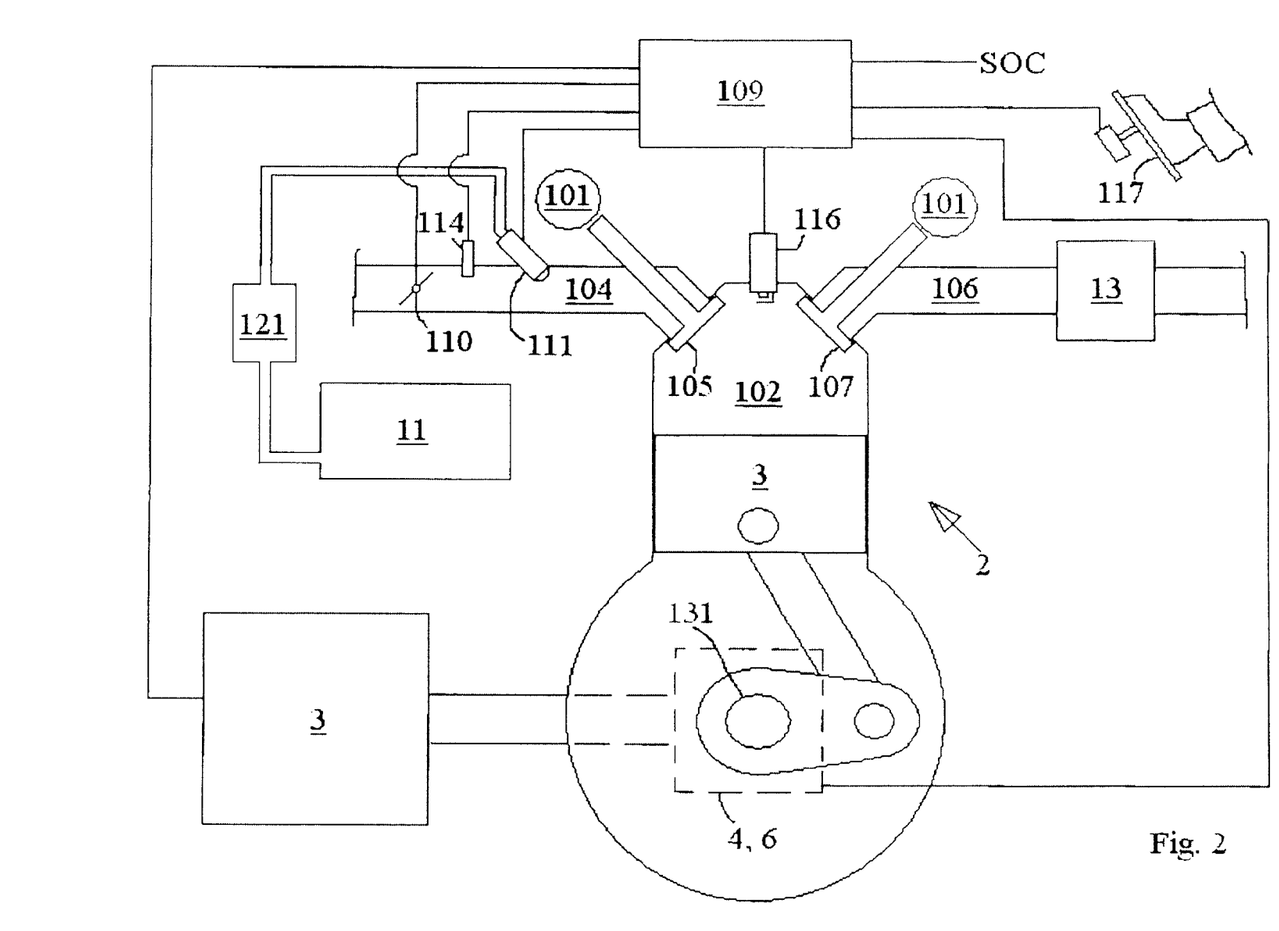
FIG. 2 shows schematically certain of the hybrid vehicle propulsion system components in FIG. 1 in some detail.

FIG. 2 shows schematically certain of the hybrid vehicle propulsion system parts in FIG. 1 in some detail. Internal combustion engine 2 comprises at least one cylinder 102 with a reciprocating piston 103 connected to a crankshaft 131. Crankshaft 131 is mechanically connected to motor 3 via transmissions 4, 6 as also depicted in FIG. 1, (transmissions 4, 6 are depicted in FIG. 2 with broken lines).

Communication between cylinder 102 and an inlet duct 104 is controlled by at least one inlet valve 105, and communication between cylinder 102 and an exhaust duct 106 is controlled by at least one exhaust valve 107. Downstream of the cylinder(s) 102, catalytic converter 13 is provided. The term catalytic converter 13 is not intended to be limiting. Alternatively, element 13 is any exhaust gas aftertreatment device such as a lean NOx trap, a SCR catalyst, a diesel particulate filter, a diesel oxidation catalyst, and any other known exhaust gas aftertreatment device.

Propulsion system 1 also comprises a control unit 109, which has computational and data memory capacities, and which can be provided as one unit, or as more than one logically interconnected physical units. Control unit 109 is adapted to control air flow by controlling a throttle valve 110. Control unit 109 is also adapted to control fuel supply by controlling at least one fuel injector 111 in the inlet duct 104. In this embodiment, where the engine presents more than one cylinder, the fuel injection can be controlled individually for each cylinder, by a fuel injector being provided at a separate portion of the inlet duct 104 communicating with the respective cylinder, (so called port fuel injection). Alternatively, as is known in the art, a fuel injector can be provided in each cylinder 102, (so called direct fuel injection). As a further alternative, one single fuel injector can be provided for more than one cylinder, or all cylinders, for example at an upstream portion of the inlet duct communicating with more than one cylinder, or all cylinders. Fuel injector(s) 111 communicate with the fuel tank 11, via a fuel pump 121.

In addition, control unit 109 is also adapted to determine the engine air flow based on signals received from an air flow sensor 114 located in the inlet duct 104. As an alternative, as is known in the art, the air flow can be computed based on parameters such as the inlet manifold pressure, throttle position, engine speed, inlet temperature, and atmospheric pressure. Methods for determining these parameters are known in the art, and not explained further here.

Further, at each cylinder, a spark plug 116 is provided and controlled by control unit 109.

Control unit 109 is adapted to determine the temperature of the catalytic converter 13 based at least partly on the air flow, the lambda value, the ambient temperature, engine load, and engine rotational speed. As an alternative, control unit 109 can be adapted to receive signals from a temperature sensor located in exhaust duct 106 between cylinder 102 and the catalytic converter 13, or in catalytic converter 13, based on which signals, the catalytic converter temperature can be determined.

Control unit 109 is further adapted to receive data corresponding to a state of charge (SOC) of the batteries 9 (FIG. 1). In addition, control unit 109 is adapted to adjust, as known in the art, the value of a requested torque parameter based on signals from an accelerator pedal 117 in the vehicle. Based at least partly on the SOC and the requested torque, control unit 109 is adapted to determine whether propulsion system 1 is to operate in a cruise mode, a battery charge mode, a power boost mode, or an electric vehicle mode, the latter being an engine off mode. Such operational modes have been briefly described above in the section "Background".

Control unit 109 is further adapted to control the output torque of motor 3. Control unit 109 is also adapted to control, in manners known in the art, activators (not shown) in transmissions 4, 6 for control of power paths therein. By suitable control of motor 3, transmissions 4, 6 and the engine, power paths in propulsion system 1 can be controlled and operational modes of propulsion system 1 can be chosen.

In the engine off mode, in dependence as described below on catalytic converter 13 temperature, control unit 109 is adapted to control fuel injector 111 and spark plug 116 so that fuel injection and ignition are inhibited.

Figure 3:
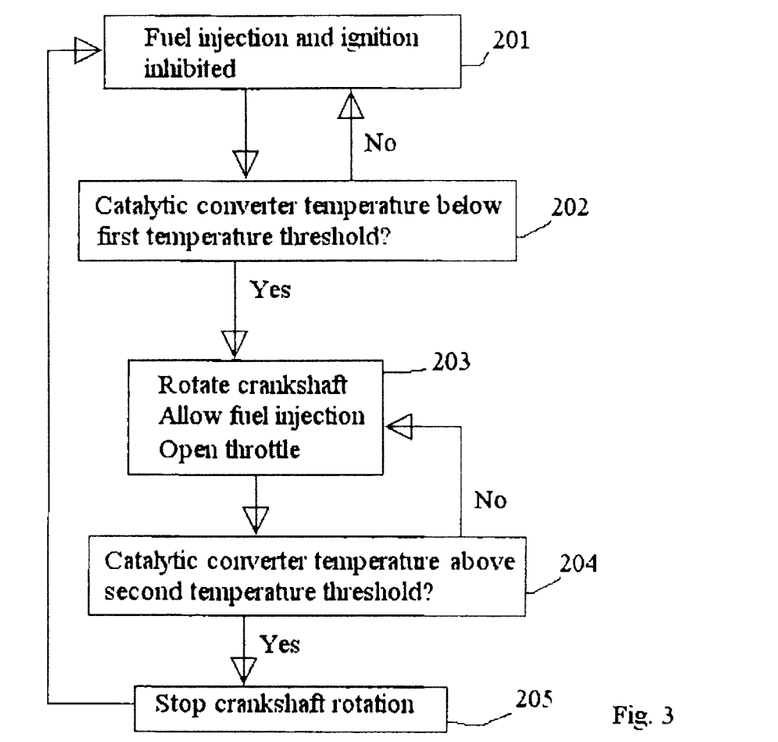
FIG. 3 shows a block diagram depicting a method according to a preferred embodiment of the invention.

FIG. 3 depicts a method according to a preferred embodiment of the invention. Control unit 109 determines 201 based on the SOC and the requested torque that propulsion system 1 is to operate in an electric vehicle mode, and fuel injection and ignition are inhibited. While fuel injection and ignition are inhibited, catalytic converter 13 temperature is monitored. Control unit 109 determines 202 whether catalytic converter 13 temperature is below a predetermined first temperature threshold value. If it is determined that catalytic converter 13 temperature is not below the first temperature threshold value, the fuel injection and ignition remain inhibited.

If it is determined that catalytic converter 13 temperature is below the first temperature threshold value, converter activation maintaining measures are taken 203, in which the ignition remains inhibited, but motor 3 and transmissions 4, 6 are controlled so that crankshaft 131 is rotated by motor 3. Also, fuel injection is allowed. In addition, throttle valve 110 is controlled so as to be open. Thereby, by piston 103 movement(s), air is pumped through cylinder(s) 103, and air and fuel is transported from cylinder(s) 102 and through exhaust duct 106, in which a substantially homogenous air/fuel mixture is provided. The mixture reaches catalytic converter 13 where it is combusted to increase the catalytic converter 13 temperature. Thereby, a further decrease of catalytic converter 13 temperature is prevented, and it can remain active.

While measures to maintain converter activation are undertaken, catalytic converter 8 temperature is monitored. Thereby, control unit 109 determines 204 whether the catalytic converter 13 temperature is above a predetermined second temperature threshold value, which is higher than the first temperature threshold value. If it is determined that the catalytic converter 13 temperature is not above the second temperature threshold value, the converter activation maintaining measures are continued 203. If it is determined that catalytic converter 13 temperature is above the second temperature threshold value, motor 3 and transmissions 4, 6 are controlled 205 so that rotation of crankshaft 131 stops and injectors 111 are controlled 201 so as to inhibit fuel injection. Control unit 109 continues to monitor catalytic converter 13 temperature, and to determine 202 whether catalytic converter 13 temperature is below the first temperature threshold value.

It should be noted that the invention is applicable to engines with any number of cylinders, i.e. one or more cylinders 102. In some embodiments of the invention, where engine 2 has a plurality of cylinders 102, and the fuel injection can be controlled individually for each cylinder, the number of cylinders 102 into which fuel is supplied, while undertaking the converter activation maintaining measures, can be dependent on the temperature of the exhaust gas aftertreatment device.

As an example, it can be assumed that the engine comprises four cylinders. During the measures to maintain converter activation, if the catalytic converter temperature is below a first temperature threshold value, fuel is injected into all cylinders. If the catalytic converter temperature is above a first temperature threshold value and below a second temperature threshold value, which is higher than the first temperature threshold value, fuel is injected in only two of the cylinders 102. If the catalytic converter temperature is above the second temperature threshold value, the converter activation maintaining measures are aborted. By controlling the number of cylinders in which fuel is injected, a coarse temperature control of the catalytic converter 13 is achieved.

Regardless of the number of cylinders in which fuel is injected during the converter activation maintaining measures, the amount of fuel injected in each cylinder can be controlled, so that a fine temperature control of the catalytic converter 13 temperature is achieved. Additional or alternative temperature control can be provided by controlling the frequency of fuel injection pulses.

Figure 4:
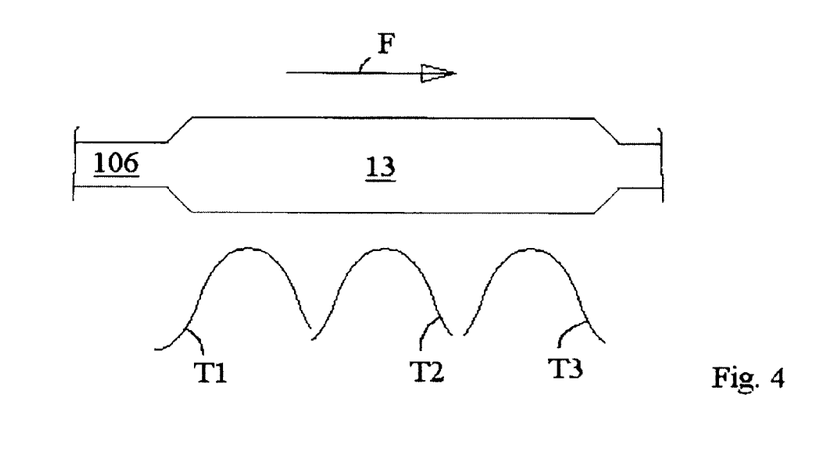
FIG. 4 is a schematic side view of a detail in FIG. 2 with temperature distribution curves.

Reference is made to FIGS. 2 and 4. In some embodiments, the method comprises controlling the throttle valve 110 so as to control the combustion in the catalytic converter 13 during the converter activation maintaining measures. Based on the flow of fuel injected, the throttle is controlled so that a combustible air/fuel mixture is provided to the catalytic converter.

Referring to FIG. 4, in which a gas flow direction is indicated with an arrow F, throttle valve 110 is controlled to control the location of a maximum temperature in the exhaust gas aftertreatment device 13. By controlling throttle valve 110 so that a relatively small air flow is provided, the air/fuel mixture will be combusted relatively far upstream in catalytic converter 13. As a result, the temperature distribution in the exhaust gas aftertreatment device, indicated in FIG. 4 by curve T1, is maximized relatively far upstream. By controlling throttle valve 110 so that larger air flows are provided, the air/fuel mixture is combusted further downstream in catalytic converter 13. As a result, the temperature distribution in the catalytic converter, T2, T3, is highest further downstream, depending on the air flow. In other words, increasing the air flow will move the maximum temperature downstream.

Thus, the location of the maximum temperature can be changed to ensure that the temperature is kept above the activation temperature throughout the entire catalytic converter.

As an alternative to, or in addition to a throttle valve 110, the air flow control can comprise control (FIG. 2), for the inlet valve(s) 5 and/or the exhaust valve(s) 7, for example in the form of a variable valve timing (VVT) system and/or a cam profile shifting (CPS) system. Such inlet and/or exhaust valve control can be used as an alternative or in addition to the throttle valve 110 for controlling the combustion in the catalytic converter 13 during the converter activation temperature maintenance.

It should be noted that instead of the motor 3, the crankshaft 131 can rotated by a further power source of the propulsion system 1.

Figure 5:
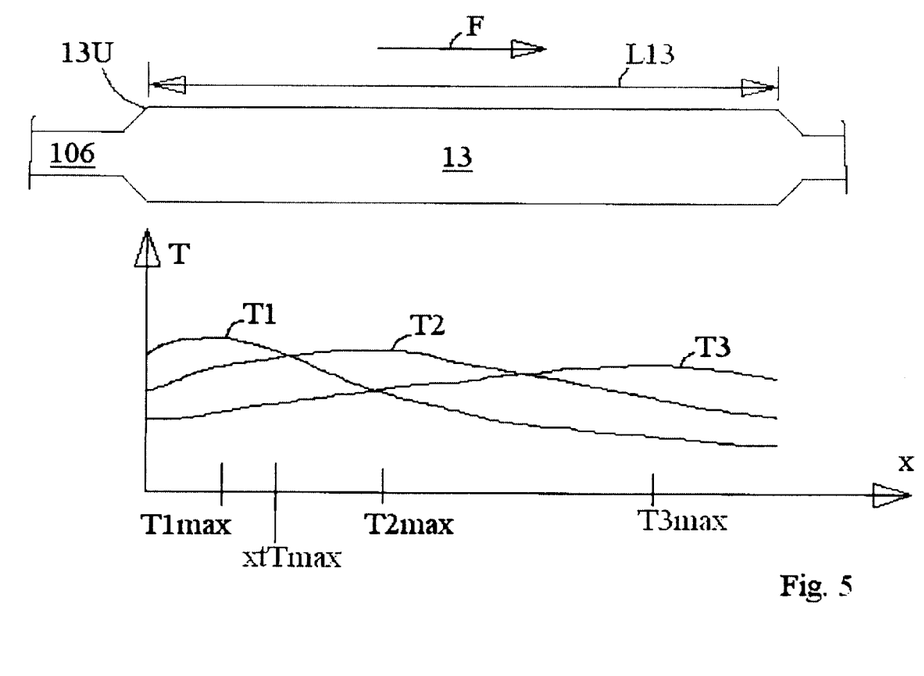
FIG. 5 is a schematic side view of the detail in FIG. 4 with a diagram depicting temperature distributions.

FIG. 5 shows another schematic view of the catalytic converter 13 in FIG. 1, a gas flow direction being indicated with an arrow F. In an alternative to the temperature control described with reference to FIG. 4, during the converter activation temperature maintenance, throttle 110 is controlled so that the air flow is reduced, preferably minimized, e.g. by throttle valve 110 being closed, or at least kept relatively low. As will be understood, decreasing the fuel injected, while retaining a constant air flow, will move the maximum temperature downstream in the catalytic converter.

Fuel injector(s) 111 are used during the converter activation maintaining measures to control the location of a maximum temperature in the exhaust gas aftertreatment device. By controlling injector(s) 111 so that a first, relatively rich air/fuel mixture is provided to catalytic converter 13, a main portion of the mixture will be combusted relatively far upstream in the catalytic converter 13. As a result, a first temperature distribution in the catalytic converter, indicated in FIG. 5 with the curve T1, is maximized, T1max, relatively far upstream.

The curve T2 shows a second temperature distribution during the converter activation maintenance, with the same air flow as in the case of the first temperature distribution T1, but where injector(s) 111 are controlled so that a second air/fuel mixture, leaner than the first air/fuel mixture, is provided to catalytic converter 13. As a result, the mixture will mainly be combusted further downstream in catalytic converter 13, with a maximum temperature, T2max, further downstream than the maximum temperature, T1max, of the first temperature distribution T1.

Finally, by controlling injector(s) 111, with the same air flow as in the case of the first and second temperature distributions T1, T2, to obtain a third air/fuel mixture, being leaner than the second air/fuel mixture, the mixture will be mainly combusted even further downstream in the catalytic converter 13. As a result, the temperature distribution T3 in the catalytic converter will present a maximum, T3max, further downstream.

Thus, the location of the maximum temperature can be changed, during the converter activation maintenance.

Referring to FIG. 5, preferably, the fuel injection is controlled so that the location of the maximum temperature is not upstream of a threshold location, xtTmax, the distance between the threshold location and the upstream end 13U of the catalytic converter 13 is at least twenty percent of the extension L13 of the catalytic converter 13 in the exhaust flow direction F.

The temperature distribution control method described with reference to FIG. 5, involves adjusting the fuel injected, while retaining a constant air flow, to move the maximum temperature downstream in the catalytic converter. It should be noted that in addition to the fuel control, the air flow can be adjusted during the converter activation maintenance to control the catalytic converter temperature distribution. In such an embodiment, throttle valve 110 can be used during the converter activation maintenance to control the location of a maximum temperature in the exhaust gas treatment device. As mentioned above with reference to FIG. 4, by controlling the throttle valve 110 so that a relatively small air flow is provided, the air/fuel mixture will be combusted relatively far upstream in the catalytic converter 13. By controlling the throttle valve 110 so that larger air flows are provided, the air/fuel mixture will be combusted further downstream in the catalytic converter 13. In other words, increasing the air flow moves the maximum temperature downstream.

Figure 6:
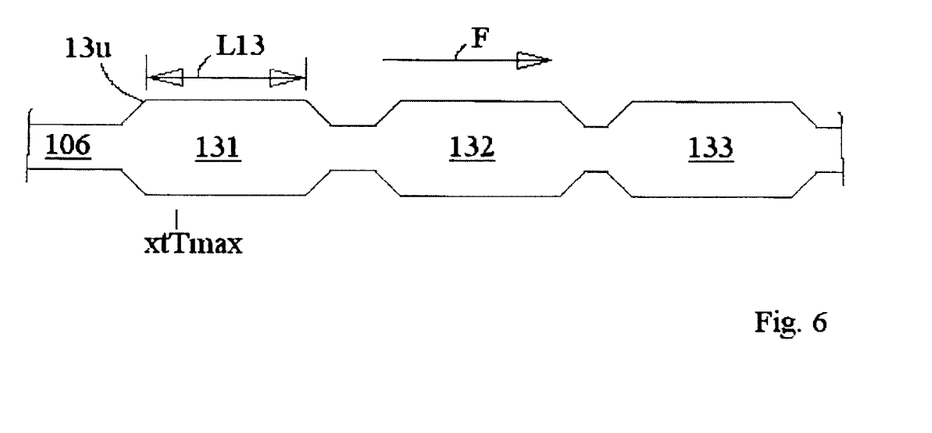
FIG. 6 is a schematic side view of an alternative to the detail shown in FIG. 5.

FIG. 6 shows schematically an alternative exhaust gas aftertreatment device comprising three catalyst monoliths 131, 132, 133, of which an upstream monolith 131 is located closest to the engine opposite to an exhaust flow direction F. Similarly to what was suggested above, during converter activation maintenance, fuel injection is controlled so that the location of the maximum temperature is not upstream of a threshold location, xtTmax. The threshold location is determined such that the distance between the threshold location, xtTmax, and an upstream end 13U of the upstream monolith 131 is at least twenty percent of the extension L18 of the upstream monolith in the exhaust flow direction F.

During the converter activation maintenance, to control the catalytic converter temperature distribution, the air flow control device and/or the fuel supply device can be controlled dependent at least partly on a model stored by the control unit 109 for a temperature distribution in the catalytic converter. The model can be based on parameters such as the air/fuel mixture, engine speed, air flow, ignition timing, and VVT-setting. As an alternative, during the converter activation maintenance, the air flow control device and/or the fuel supply device can be controlled, to control the catalytic converter temperature distribution, at least partly in dependence on signals from a plurality of temperature sensors distributed so as to detect the temperature at locations along the catalytic converter.

Embodiments of a method for controlling, during converter activation maintenance, the air flow control device and/or the fuel supply device based at least partly on a desired temperature distribution in the catalytic converter has been presented. As understood by the person skilled in the art, the mapping of air/fuel ratios to catalytic converter temperature distributions can be done in a test environment, and can involve adjusting the air/fuel ratio while monitoring the catalytic converter temperature distribution.

Figure 7:
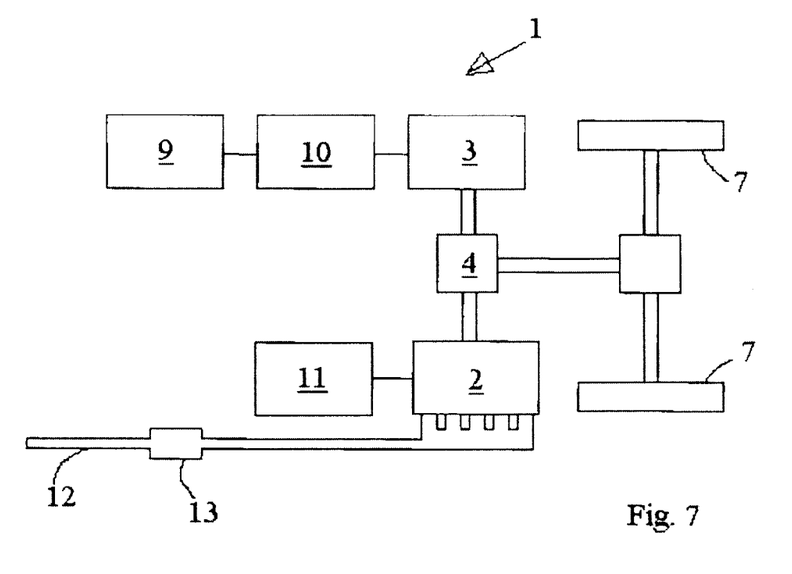
FIG. 7 shows a schematic view of a hybrid vehicle propulsion system with a parallel hybrid structure.

Referring to FIG. 7, showing parts of a hybrid vehicle propulsion system 1 with a parallel hybrid structure, an alternative embodiment of the invention will be described. Propulsion system 1 comprises an internal combustion engine 2 and an additional power source 3 in the form of a combined electric motor and generator 3. The combined motor and generator 3 is via a converter 10 electrically connected to an energy storage unit 9 comprising a plurality of batteries. A fuel tank 11, and an exhaust system 12 with an exhaust gas aftertreatment device 13 are provided for engine 2.

A transmission 4 provides, in a manner known in the art, a mechanical connection between the engine 2, the combined motor and generator 3 and two wheels 7 of the vehicle. The transmission 4 is controllable as described below and works as power split device to allow the power path from engine 2 to be mechanically directed to wheels 7, or to combined motor and generator 3. Transmission 4 also allows mechanical power from combined motor and generator 3 to be directed to engine 2, as discussed closer below.

Figure 8:
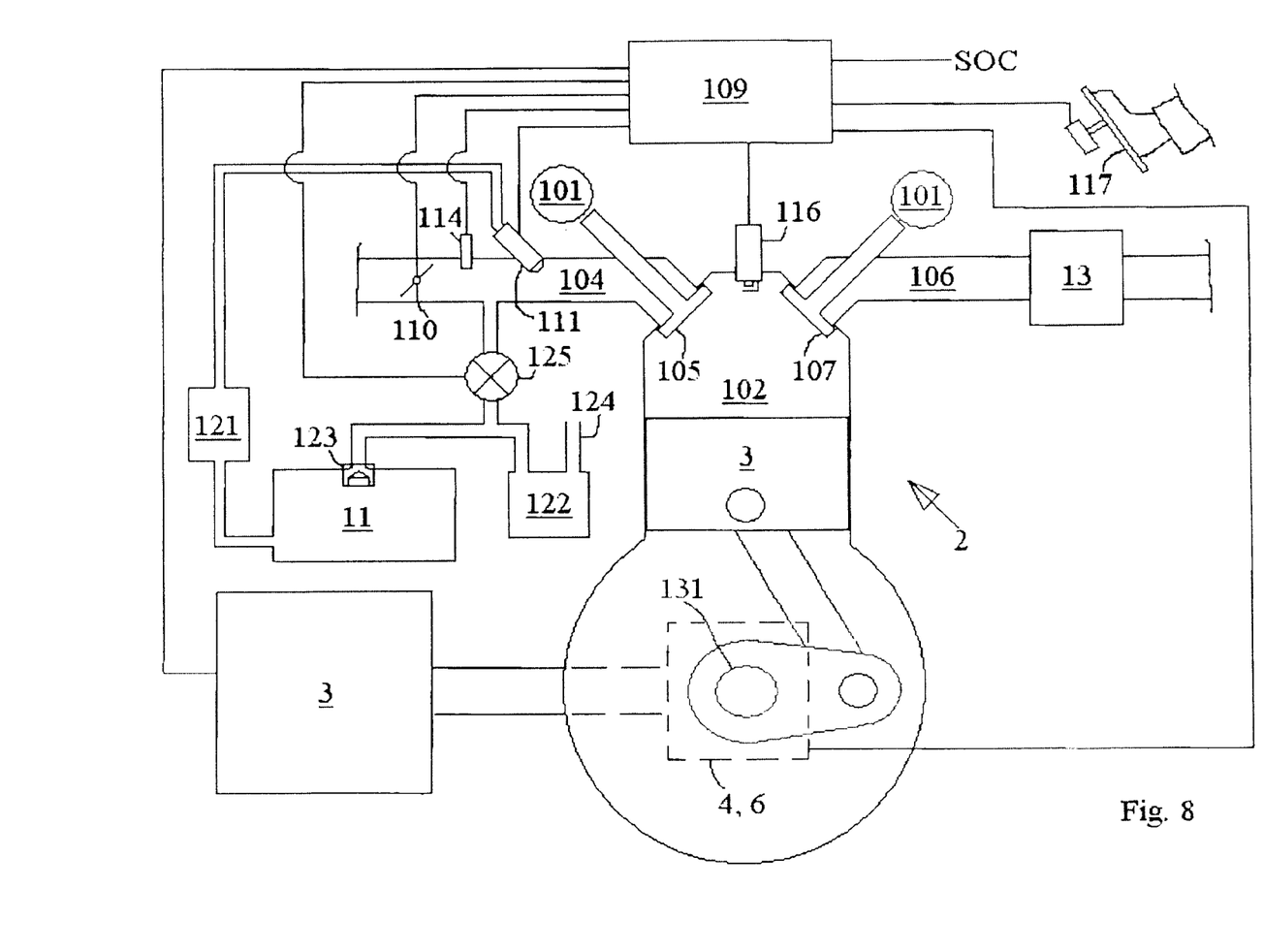
FIG. 8 shows schematically certain of the hybrid vehicle propulsion system parts in FIG. 7 in some detail.

FIG. 8 shows schematically certain of the hybrid vehicle propulsion system parts in FIG. 7 in some detail, which parts correspond to the ones described above with reference to FIG. 2, except for the following details: The engine system is provided with a fuel vapor canister 122, which could enclose carbon for retaining vaporized fuel as known in the art. The canister 122 can communicate with the fuel tank 11 via a vapor vent valve 123. Further, the canister 122 is provided with a canister air inlet 124. The canister 122 and fuel tank 11 can communicate with inlet duct 4 via a purge gas supply valve 125, which is controllable by control unit 109.

Alternatively, or in addition, the purge gas supply valve 125 can comprise a purge gas supply pump controllable by the control unit, and adapted to pump purge gas (fuel vapors) from canister 122 and/or fuel tank 11 into inlet duct 4.

Figure 9:
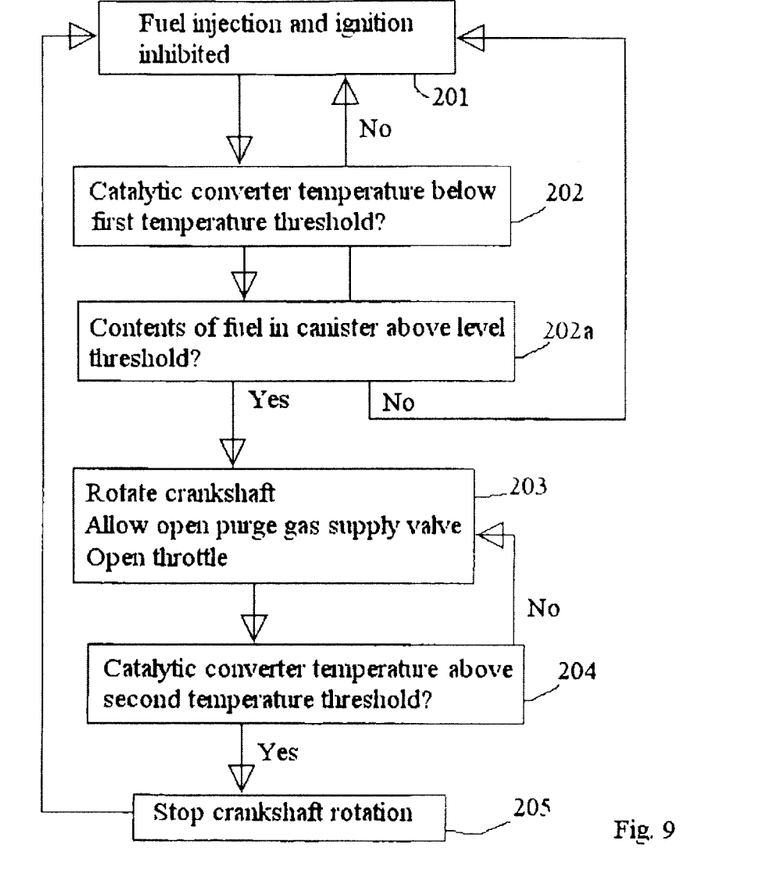
FIG. 9 shows a block diagram depicting a method according to an alternative embodiment of the invention.

FIG. 9 depicts a method according to the alternative embodiment of the invention, in the hybrid vehicle propulsion system 1 in FIG. 7. The method corresponds to the one that has been described above with reference to FIG. 3, with some exceptions.

As in FIG. 3, control unit 109 determines 201 that propulsion system 1 is to operate in an electric vehicle mode, and catalytic converter 13 temperature is monitored. If it is determined 202 that catalytic converter 13 temperature is below a first temperature threshold value, it is determined 202a whether the contents of fuel in canister 122 is above a predetermined canister level threshold value. The contents of canister 122 can be determined as is known in the art, for example based on measured values of lambda, injected fuel and air flow. If it is determined 202a that the contents of fuel in canister 122 is below the threshold value, it is determined that no or alternative converter activation maintenance are carried out.

If it is determined 202a that the contents of fuel in canister 122 is above the threshold value, converter activation maintenance are taken 203, in which the ignition remains inhibited, but motor 3 and transmission 4 is controlled so that crankshaft 131 is rotated by combined motor and generator 3. Also, purge gas supply valve 125 is controlled so that fuel from canister 122 is allowed into inlet duct 104 so as to mix with air, allowed by the open throttle valve 110. Thereby, by piston 103 movement(s), air and fuel are pumped through cylinder(s) 103, and transported through exhaust duct 106, in which a air/fuel mixture is provided, which reaches catalytic converter 13 where it is combusted to increase catalytic converter 13 temperature.

As in FIG. 3, while converter activation maintenance is undertaken, control unit 109 determines 204 whether catalytic converter 13 temperature is above a predetermined second temperature threshold value, which is higher than the first temperature threshold value. If it is determined that catalytic converter 13 temperature is above the second temperature threshold value, motor 3 and transmissions 4, 6 are controlled 205 so that rotation of the crankshaft 131 stops.

Figure 10:
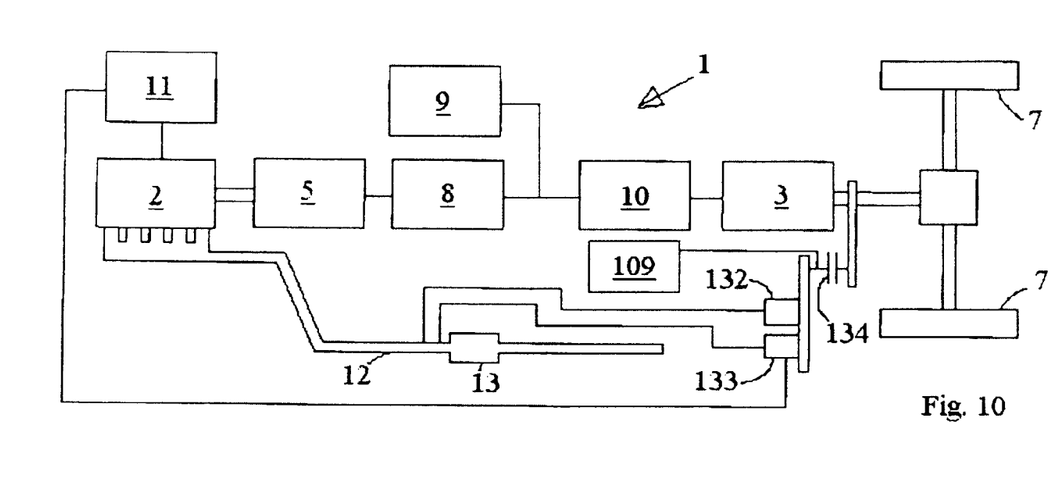
FIG. 10 shows a schematic view of a hybrid vehicle propulsion system with a series hybrid structure.

Referring to FIG. 10, showing parts of a hybrid vehicle propulsion system 1 with a series hybrid structure, a further alternative embodiment of the invention will be described. Propulsion system 1 comprises an internal combustion engine 2 and an additional power source 3 in the form of an electric motor 3. Engine 2 is mechanically connected to a generator 5 which is electrically connected to a charger 8, which in turn is connected to a plurality of batteries 9, and to a converter 10, the latter being connected to the motor 3, which is mechanically connected to two wheels 7 of the vehicle. Fuel tank 11 and an exhaust system 12 with an exhaust gas aftertreatment device 13 in the form of a catalytic converter 13 are provided for the engine 2.

Propulsion system 1 comprises an air pump 132 and a fuel pump 133 adapted to supply air and fuel into exhaust system 12 upstream from catalytic converter 13. The fuel pump is adapted to be fed from fuel tank 11. Air pump 132 and the fuel pump are adapted to be driven by motor 3 via a mechanical connection, including for example belt drives, and also a clutch 134, controllable by a control unit 109 for engagement and disengagement of pumps 132, 133 with motor 3.

Figure 11:
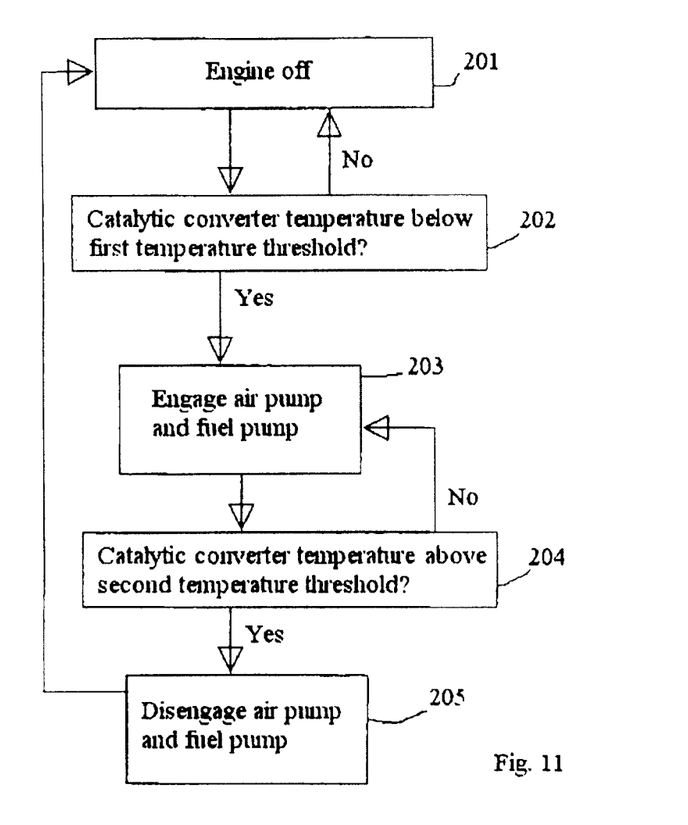
FIG. 11 shows a block diagram depicting a method according to a further alternative embodiment of the invention.

FIG. 11 depicts a method according to the further alternative embodiment of the invention, in the hybrid vehicle propulsion system 1 in FIG. 10. The method corresponds to the one that has been described above with reference to FIG. 3, with some exceptions.

Control unit 109 determines 201 that propulsion system 1 is to operate in a mode in which the engine is off. As in FIG. 3, catalytic converter 13 temperature is monitored by the control device 109. If it is determined 202 that catalytic converter 13 temperature is below a first temperature threshold value, converter activation maintenance are taken 203, in which clutch 134 is controlled 203 so as to engage pumps 132, 133. Thereby, air and fuel are introduced into exhaust system 12 to form a mixture, which reaches the catalytic converter 13 where it is combusted to increase catalytic converter 13 temperature.

As in FIG. 3, while the converter activation maintenance are undertaken, control unit 109 determines 204 whether catalytic converter 13 temperature is above a predetermined second temperature threshold value, which is higher than the first temperature threshold value, and if it is determined that catalytic converter 13 temperature is above the second temperature threshold value, clutch 134 is controlled 205 so as to disengage pumps 132, 133.

It should be noted that instead of motor 3, air pump 132 and fuel pump 133 in FIG. 10 could be driven by some alternative driving device of propulsion system 1.

The invention is of course also applicable to hybrid vehicles combining more than two power sources for its propulsion, one of them being an internal combustion engine.

Above, embodiments with spark ignition internal combustion engines have been described, but it should be noted that the invention is applicable to hybrid vehicle propulsion systems with alternative types of internal combustion engines, for example diesel engines. For a diesel engine, converter activation maintenance could for example involve, while the crankshaft is being rotated by the additional power source, injecting fuel during an exhaust stroke in the respective cylinder, i.e. when the respective exhaust valve is open.

We claim:

1. A method for operating a hybrid vehicle having an internal combustion engine with an exhaust gas aftertreatment device (EGAD), comprising:
   identifying a minimum activation temperature of the EGAD;
   determining that, when the engine is off, an EGAD temperature is lower than the minimum activation temperature; and
   supplying air and fuel to the EGAD in a mixture to cause combustion in the EGAD.

2. The method of claim 1 wherein said hybrid vehicle has an additional power source coupled to the engine and the air is supplied by causing said additional power source to rotate the engine.

3. The method of claim 1 wherein the mixture is established so as to provide a maximum temperature at a desired stream-wise location in the exhaust gas aftertreatment device.

4. The method of claim 1 wherein said engine has an inlet duct in which a throttle valve is disposed, and the mixture is established at least in part by controlling a position of said throttle valve.

5. The method of claim 3 wherein said desired stream-wise location of maximum temperature is at least 20% of the length away from an upstream end of the EGAD.

6. The method of claim 3 wherein said desired stream-wise location of maximum temperature is at least 50% of the length away from an upstream end of the exhaust gas aftertreatment device.

7. The method of claim 1 wherein said fuel is supplied from a fuel vapor canister and is metered by a fuel purge gas valve.

8. The method of claim 1 wherein said fuel is supplied from a fuel tank and is metered by a fuel injector.

9. The method of claim 1 wherein the air is supplied to the EGAD downstream of at least one cylinder of the engine.

10. The method of claim 1 wherein the fuel is supplied downstream of at least one cylinder of the engine.

11. The method of claim 1 wherein the air-fuel mixture supplied to the EGAD has a lambda value of at least 1.0.

12. The method of claim 1 wherein the air-fuel mixture supplied to the EGAD has a lambda value between 1.25 and 2.0.

13. A method for operating a hybrid propulsion system having an internal combustion engine and an additional power source, the engine having an exhaust gas aftertreatment device (EGAD) coupled to an exhaust of the engine, said method comprising:
   identifying a minimum activation temperature of the EGAD;

determining that an EGAD temperature is below a threshold temperature selected to prevent the EGAD temperature falling below the minimum activation temperature;

pumping air to the EGAD when the engine is off by rotating a crankshaft of the engine by said additional power source; and commanding at least one fuel injector to supply fuel to at least one cylinder of the engine and thereby to the EGAD, wherein an amount of fuel injected is controlled to cause combustion and thereby prevent a temperature within the EGAD dropping below the minimum activation temperature.

14. The method of claim 13 wherein the amount of fuel is controlled to cause combustion at a desired stream-wise region of the EGAD.

15. A hybrid vehicle propulsion system comprising:
an internal combustion engine having a crankshaft, at least one cylinder, and an exhaust gas treatment device (EGAD) located downstream of the at least one cylinder;
an additional power source;
a fuel storage device;
a fuel supply device controlling an amount of fuel provided to the engine from the fuel storage device; and
a control unit electronically coupled to the fuel supply device and the additional power source, the control unit comparing an EGAD temperature with a threshold temperature selected in relation to a minimum activation temperature of the EGAD and, if the EGAD temperature is below the threshold temperature, causing the additional power source to rotate the engine while commanding the fuel supply device to provide fuel to the engine when the engine is off, the rotation of the crankshaft and the amount of fuel being controlled to cause combustion within the EGAD.

16. The system of claim 15, further comprising:
a throttle valve disposed in an intake duct of the engine, said throttle valve electronically coupled to the control unit wherein said control unit controls said throttle valve so as to provide a maximum temperature at a desired stream-wise location of the EGAD.

17. The system of claim 16 wherein the desired stream-wise location is downstream of an upstream end of the EGAD by at least 20% of a total length of the EGAD.

18. The system of claim 16 wherein the desired stream-wise location is downstream of an upstream end of the EGAD by at least 50% of a total length of the EGAD.

19. The system of claim 15 wherein said fuel storage device comprises a fuel tank and said fuel supply device comprises a fuel injector.

20. The system of claim 15 wherein said fuel storage device comprises a fuel vapor container and said fuel supply device comprises a fuel purge gas valve.

21. The system of claim 15 wherein an air-fuel ratio supplied to the EGAD is at least 1.0.

22. The system of claim 15 wherein an air-fuel ratio supplied to the EGAD is between 1.25 and 2.0.

23. The system of claim 15 wherein said engine is a diesel engine, said fuel supply device is a fuel injector, and said fuel injector supplies fuel late in an expansion stroke when said engine is off.

24. The system of claim 19 wherein said fuel injector is disposed upstream of the cylinder.

25. The system of claim 19 wherein said fuel injector is disposed in the cylinder.

* * * * *